United States Patent
Haustein et al.

(10) Patent No.: US 8,989,291 B2
(45) Date of Patent: Mar. 24, 2015

(54) SPATIAL PRE-CODING FOR TRANSMITTING DATA WITHIN A MOBILE TELECOMMUNICATION NETWORK

(75) Inventors: Thomas Haustein, Potsdam (DE); Hanguang Wu, Guangzhou (CN); Wolfgang Zirwas, München (DE)

(73) Assignee: Nokia Solutions and Networks Oy, Espoo (FI)

( * ) Notice: Subject to any disclaimer, the term of this patent is extended or adjusted under 35 U.S.C. 154(b) by 577 days.

(21) Appl. No.: 13/148,580

(22) PCT Filed: Feb. 10, 2009

(86) PCT No.: PCT/EP2009/051508
§ 371 (c)(1), (2), (4) Date: Oct. 14, 2011

(87) PCT Pub. No.: WO2010/091717
PCT Pub. Date: Aug. 19, 2010

(65) Prior Publication Data
US 2012/0027005 A1    Feb. 2, 2012

(51) Int. Cl.
*H04B 7/02*    (2006.01)
*H04B 7/06*    (2006.01)
*H04B 7/04*    (2006.01)

(52) U.S. Cl.
CPC ............ *H04B 7/0617* (2013.01); *H04B 7/0452* (2013.01); *H04B 7/0602* (2013.01); *H04B 7/0691* (2013.01)
USPC ........................................................ 375/267

(58) Field of Classification Search
CPC .. H04B 7/0617; H04B 7/0602; H04B 7/0452; H04B 7/0691
USPC ......... 375/259, 260, 267, 285, 295, 316, 296; 455/91, 101, 73, 39, 114.2, 114.3
See application file for complete search history.

(56) References Cited

U.S. PATENT DOCUMENTS

| 2008/0192718 A1* | 8/2008 | Jongren et al. ................. 370/342 |
| 2009/0017769 A1 | 1/2009 | Chen et al. ....................... 455/69 |

FOREIGN PATENT DOCUMENTS

| WO | WO 2007/041845 A1 | 4/2007 |
| WO | WO 2007/095102 A1 | 8/2007 |
| WO | WO 2008097042 A2 * | 8/2008 |

OTHER PUBLICATIONS

Wu, H., et al., "Sum Rate Analysis of SDMA Transmission in Single Carrier FDMA System", © 2008 IEEE, 5 pgs.
(Continued)

*Primary Examiner* — Vineeta Panwalkar
(74) *Attorney, Agent, or Firm* — Harrington & Smith

(57) ABSTRACT

A method for transmitting data within a mobile telecommunication system from a user equipment having at least two transmit antennas to a base station having at least two receive antennas. The method comprises (a) providing a number of data streams at the user equipment, wherein the number of data streams is smaller than the number of transmit antennas, (b) applying a spatial pre-coding to the data streams, and (c) transmitting the spatially pre-coded data streams to the base station via the transmit antennas, wherein the number of transmit antennas used for transmitting the spatially precoded data streams is larger than the number of data streams. A corresponding method for receiving data, a user equipment for carrying out the data transmitting method, a base station for carrying out the data receiving method and a computer program for controlling the described data transmitting and/or receiving method.

19 Claims, 2 Drawing Sheets

(56) References Cited

OTHER PUBLICATIONS

Svensson, T., et al., "B0IFDMA—A Power Efficient Multiple Access Scheme for Non-frequency-adaptive Transmission", Jul. 2007, IST Mobile and Wireless Communications Summit, Budapest, Hungary, 5 pgs.

Myung, H.G., "Introduction to Single Carrier FDMA", © 2007 EURASIP, 5 pgs.

Sorger, U., et al., "Interleaved FDMA—A New Spread-Spectrum Multiple-Access Scheme", © 1998 IEEE, 5 pgs.

Myung, H.G., et al., "Peak-to-Average Power Ratio of Single Carrier FDMA Signals with Pulse Shaping", © 2006 IEEE, 5 pgs.

R1-050765, TSG-RAN WG1 #42, London, UK, Aug. 29-Sep. 2, 2005, Ericsson, "Some Aspects of Single-Carrier Transmission for E-UTRA", 5 pgs.

Lim, J., et al., "Channel-Dependent Scheduling of Uplink Single Carrier FDMA Systems", © 2006 IEEE, 5 pgs.

\* cited by examiner

SPATIAL PRE-CODING FOR TRANSMITTING DATA WITHIN A MOBILE TELECOMMUNICATION NETWORK

FIELD OF INVENTION

The present invention relates to the transmission strategy and to a radio resource management for uplink (UL) data transmission within a mobile telecommunication system, in particular within a multi-user Multiple Input Multiple Output (MIMO) Single Carrier-Frequency Division Multiple Access (SC-FDMA) system. Specifically, the present invention relates (a) to a method for transmitting data within a mobile telecommunication system from a user equipment having at least two transmit antennas to a base station having at least two receive antennas, (b) to a corresponding method for receiving data, (c) to user equipment for carrying out the described data transmitting method, (d) to a base station for carrying out the described data receiving method and (e) to a computer program for controlling the described data transmitting and/or data receiving method.

ART BACKGROUND

Single carrier Frequency Division Multiple Access (SC-FDMA) is currently the standard uplink transmission scheme in 3GPP Long Term Evolution (LTE) mobile telecommunication systems. SC-FDMA can be viewed as a Discrete Fourier Transform (DFT) pre-coded Orthogonal Frequency Division Multiple Access (OFDMA) wherein a signal being transmitted in the uplink (UL) direction from a User Equipment (UE) to a Base Station (BS) will be first transformed into the frequency domain via an N point DFT and the DFT output will be assigned to a number of selected subcarriers within one single carrier for transmission. The main advantage of SC-FDMA is that it allows for a lower Peak-to-Average power ratio (PAPR) compared to that of OFDMA for low order modulation schemes like Binary Phase Shift Keying (BPSK) and Quadrature Phase Shift Keying (QPSK), which benefits the mobile UE in terms of power efficiency [1]. However, this requires the selected sub-carriers to be consecutive or equidistantly distributed in the entire bandwidth of the single carrier [2]. These sub-carrier selection methods are usually referred to as localized FDMA (LFDMA) [3] and interleaved FDMA (IFDMA) [4], respectively. It has been shown that IFDMA has the lowest PAPR [3] which also provides large frequency diversity, while LFDMA can benefit more from frequency dependent scheduling to improve the overall data throughput within a SC-FDMA mobile telecommunication system [5]. Another variant of DFT pre-coded OFDMA using regularly interleaved blocks of sub-carriers is denoted Block-IFDMA (B-IFDMA), which provides robustness to frequency offsets at the expense of increased PAPR compared to IFDMA [6].

In a SC-FDMA telecommunication system, wherein both UE and BS have at least two antennas, there are two uplink radio transmission scenarios, which are briefly presented below under item A) and B).

(A)
Single-User MIMO
One possibility of the uplink transmission strategy within a SC-FDMA telecommunication system is to use the so called single-user MIMO technique. In this configuration, each UE accesses the radio channel in a (Time Division Multiple Access (TDMA) mode. Within the assigned Physical Resource Blocks (PRBs) for radio transmission of one time slot, only one UE is active and it can use spatial multiplexing technique to transmit up to $n_t$ independent data streams from different antennas. Thereby, $n_t$, which is the number of transmit antennas of the UE, is smaller than the number $n_r$, which is the number of receive antennas of the BS ($n_r > n_t$).

This Single-user MIMO scheme has several disadvantages:

(1) Due to the typically limited space of the UE, the transmit antennas mounted in the UE are likely to be highly correlated. As a consequence, data streams from different antennas may be harder to separate by the BS.

(2) A small singular value of the channel matrix $\underline{H}$ in one PRB, which is equal to a rank deficiency of $\underline{H}$ in that PRB, will degrade the rate of the whole data throughput because the transmit power will have to be drained in that PRB. This can be understood because DFT pre-coded OFDM is equivalent to an equal gain power allocation. Thus the use of "bad" PRBs is reducing the spectral efficiency dramatically compared to OFDM without a DFT pre-coding. Consequently, only less data streams can be supported.

(B)
Multi-User SDMA with Using Only One Antenna Per UE
The second possibility of the uplink transmission strategy is that each UE uses only one antenna to transmit a single data stream and up to $n_r$ data streams from different UEs can be multiplexed in space which can be separated at the BS. The technique is also called multi-user SDMA or virtual MIMO technique. Thereby, similar to OFDMA systems, SC-FDMA is combined with Spatial Division Multiple Access (SDMA) by applying spatial processing on a sub-carrier basis, in the frequency domain after DFT pre-coding to improve the data throughput within the telecommunication system. This technique enables independent data streams from different user equipments (UEs) to use the same sub-carriers to communicate with the BS simultaneously. At the BS receiver, simple MIMO equalization such as for instance zero-forcing (ZF) equalization can be carried out in the frequency domain to separate the data streams from different UEs, which are then transformed back to the time domain via Inverse Discrete Fourier Transform (IDFT) for data decoding and detection. However, in a telecommunication system with UEs each employing a single antenna only (further antennas are switched off), the compound channel between the transmit antennas of the UEs and the receive antennas at the BS will be close to rank deficiency at some sub-carriers if the UEs have similar spatial signatures at those sub-carriers. Moreover, even the UEs can be well separated in spatial domain but they may experience deep fades at some sub-carrier due to the frequency selectivity of the mobile channel. Unlike OFDMA systems, those sub-carriers cannot be excluded from transmission due to sub-carrier mapping constraints. Consequently, the compulsory usage of those sub-carriers will lead to significant loss of the overall data throughput within the telecommunication system [7]. This holds in particular if the UEs occupy large bandwidth, which is a typical case in future broadband wireless telecommunication systems.

Specifically, the virtual MIMO technique described under item (B) can mitigate the first disadvantage (1) of the single-user MIMO UL radio transmission technique by exploiting the degrees of freedom in user grouping also known as multi-user diversity, but it cannot overcome the second disadvantage (2) of a rank deficiency of the channel matrix $\underline{H}$ on some of the PRBs.

There may be a need for providing an uplink radio transmission strategy which allows for a large overall data throughput within a multi-user MIMO SC-FDMA telecommunication system.

SUMMARY OF THE INVENTION

This need may be met by the subject matter according to the independent claims. Advantageous embodiments of the present invention are described by the dependent claims.

According to a first aspect of the invention there is described a method for transmitting data within a mobile telecommunication system from a user equipment having at least two transmit antennas to a base station having at least two receive antennas. The described method comprises (a) providing a number of data streams at the user equipment, wherein the number of data streams is smaller than or equal to the number of transmit antennas, (b) applying a spatial pre-coding to the data streams, and (c) transmitting the spatially pre-coded data streams to the base station via the transmit antennas. Thereby, the number of transmit antennas used for transmitting the spatially pre-coded data streams is larger than the number of data streams.

This first aspect of the invention is based on the idea that the effective radio channel between the user equipment (UE) and the base station (BS) can be steered by an appropriate spatial pre-coder. Thereby, the achievable data throughput within the mobile telecommunication system can be significantly increased.

Generally speaking, as long as one of the UEs in the telecommunication system has at least two transmit antennas and the total number of data streams from all the UEs is not bigger than the total number of receive antennas at the BS, spatial precoding can be used to steer the compound channel such that different data streams may be effectively separated at the BS. For example, one of the UEs may only have one antenna (the legacy terminal) and the other UEs with multiple antennas can use spatial precoding (either frequency selective or non-selective) to steer the compound channel between all the UEs and the BS.

In this respect it is pointed out that the described method cannot only be carried out for one UE within the mobile telecommunication system. The described method can rather be carried out by at least two UEs, which are served by the BS. Thereby, the spatial pre-coding can be performed by at least one of the UEs in such a manner that different data streams from one or more UEs can be effectively separated by the BS from each other by an appropriate spatial post-processing. In other words, interference between the different data streams can be minimized by choosing an appropriate spatial pre-coding scheme.

A spatial pre-coding can be realized by an additional mathematical operation, which is performed at the UE when generating the radio signals for the data streams, which are supposed to be transmitted. Thereby, inter alia the radio channel matrix between the UE and the BS is used. The radio channel matrix, which is usually denoted with $\underline{H}$, is given in a known manner by the qualities of the various radio links, which extend between respectively one transmit antenna of the UE and respectively one receive antenna of the BS.

The spatial pre-coding may be realized for instance by means of a vector (a row vector or a column vector) or a matrix, which is multiplied with the radio channel matrix when processing the data streams into appropriate radio signals.

The BS may support up to as many data streams simultaneously from all the UEs as the number of their receive antennas within the same assigned Physical Resource Block (PRB), i.e. at the same time and at the same radio frequency. This capability with respect to the number of manageable data streams can be achieved for instance by using a linear equalizer/detector performing e.g. a zero forcing. The effective radio channels between all the transmit antennas and all the receive antennas is then governed by the spatial pre-coders of all the UEs, physical channel and spatial post-processing.

According to an embodiment of the invention the spatial pre-coding is carried out in such a manner, that a condition number of a channel matrix representing the radio link qualities between the various transmit antennas of the user equipment and the various receive antennas of the base station is reduced. Thereby, the condition number may be given by the ratio between the singular values the channel matrix.

By reducing the condition number a situation can be avoided, wherein the channel matrix respectively the compound channel matrix is close to a numerical rank deficiency.

The problem of a rank deficiency or a situation close to rank deficiency of a Multiple Input Multiple Output (MIMO) radio communication scenario may be caused by a spatial correlation due to the scattering environment and the antenna configurations of the UE and/or the BS. By introducing the additional spatial pre-coding a rank deficiency can be easily overcome and, as a consequence, the MIMO capacity may be greatly improved. By contrast to a rank deficiency situation, wherein adding more (co-located) antennas would only waste resources, a radio communication scenario, which is not suffering from a rank deficiency of the channel matrix, allows to enhance the data throughput. This holds also if more transmit and/or more receive antennas are added to the respective network element of the MIMO telecommunication system.

Descriptive speaking, the effective radio channel condition can be steered by the spatial pre-coding in order to avoid a rank deficiency of the channel matrix. Thereby, the achievable data throughput within the mobile telecommunication system can be significantly enhanced.

Generally speaking, the spatial pre-coding carried out by the UEs can be designed to change the spatial signature of the physical channel between the respective UE and the BS. Thereby, it can be ensured that a full rank effective channel matrix results for each PRB. This means that within one PRB, i.e. during the same time and at the same radio frequency, the different data streams can be separated from each other such that an effective spatial multiplexing is realized.

According to a further embodiment of the invention transmitting the spatially pre-coded data streams is carried out via all of the at least two transmit antennas. This may provide the advantage that all transmit antennas will be involved in the described data transmitting procedure. Thereby, all available technical appliances of the UE's antenna system will be utilized.

In this respect it is mentioned that the number of data streams and the number of transmit antennas might also differ by more than one. In this case the pre-coding for more than one radio channel extending between the UE and the BS of the MIMO system can be used for steering the effective radio channel between the UE and the BS.

According to a further embodiment of the invention the mobile telecommunication system is a Multiple Input Multiple Output Single Carrier-Frequency Division Multiple Access telecommunication system. This may provide the advantage that the described method can be used for a radio transmission scheme, which is the currently standard radio transmission scheme for Long Term Evolution (LTE) telecommunication networks. Thereby, no hardware adaption may be necessary for LTE network elements such as UEs and/or BSs.

Carrying out the described method in a multi-user MIMO Single Carrier-Frequency Division Multiple Access (SC-FDMA) telecommunication system may further provide the advantage that the well known low Peak-to-Average Power Ratio (PAPR) of SC-FDMA will not be deteriorated even if the overall data throughput in the uplink (UL) is significantly increased.

It has to be mentioned that the described method can also be applied in a non-precoded OFDMA system or a general precoded OFDMA system as long as the precoded signal spreads over some frequency bins. By steering the compound channel matrix for some PRBs rank deficiency problems can be effectively avoided.

Further, the described method can also be applied to a telecommunication system in case a low post-detection Signal-to-Noise Ration (SNR) occurs in the conventional virtual MIMO SC-FDMA mode because of a deep channel fade (instead of a channel rank deficiency for some PRBs). With using an additional antenna, channel deep fades can be mitigated due to the diversity gain and hence the overall throughput can be improved effectively.

According to a further embodiment of the invention the method further comprises (a) providing a number of further data streams at a further user equipment having at least two further transmit antennas, wherein the number of further data streams is smaller than or equal to the number of further transmit antennas, (b) applying a spatial pre-coding to the further data streams, and (c) transmitting the spatially pre-coded further data streams to the base station via the further transmit antennas. Thereby, the number of further transmit antennas used for transmitting the spatially pre-coded data streams is larger than the number of further data streams. This means that the described method may also be applied within a multi-user telecommunication system and in particular within a multi-user SC-FDMA telecommunication system.

In this respect it is mentioned that the described method can of course also be carried out with more than two UEs. With regard to the number of supported UEs there is no principal limitation. OF course, a higher number of receive antennas at the BS will allow to support a higher number of UEs.

According to a further embodiment of the invention the spatial pre-coding is carried out in such a manner that the sum data throughput within the mobile telecommunication system is increased.

In order to achieve an increased or a maximal overall data throughput the spatial pre-coders to be used by the UE might be calculated by applying appropriate algorithms.

According to a further embodiment of the invention the spatial pre-coding is carried out in such a manner that the data throughput for the user equipment is the same as for the further user equipment. This may mean that the allocated data rate for each UE is balanced.

According to a further embodiment of the invention (a) applying a spatial pre-coding to the data streams comprises applying a non-frequency selective spatial pre-coder using the eigenvector of the spatial channel extending between the user equipment and the base station and (b) applying a spatial pre-coding to the further data streams comprises applying an orthogonal spatial pre-coding to the further data streams. Thereby, the orthogonal spatial pre-coding can be optimized depending on the allocated PRB and in particular depending on the allocated radio frequency.

According to a further embodiment of the invention the method further comprises steering the individual data rates of the user equipment and the further user equipment by applying a spatial scheduler. Thereby, for instance the individual data rates can be balanced such that each UE can realize the same data rate within the mobile telecommunication system.

For instance using a standard proportional fair scheduler over the spatial data streams will change the order of selecting which UE is using the Eigenvector and which UE is using the orthogonal beam such that in the end both UEs will have the same average throughput. Further, by putting additional weights the individual throughput of the UEs can be steered.

According to a further embodiment of the invention frequency non-selective pre-coders are used for the spatial pre-coding of the data streams and/or of the further data streams. This may mean that the same pre-coders are used for all subcarriers.

This may provide the advantage that low PAPR properties of the transmitted radio signal can be maintained and the signaling overhead within the telecommunication system can be kept within comparatively small limits. Further, because of a principal power limitation frequency non-selective pre-coders are in particular favorable for UEs being situated at the edge of the cell, which is spanned by the BS In this respect it is mentioned that the pre-coders of at least one UE can be varied over frequency.

According to a further embodiment of the invention the method further comprises taking a pre-coder for the spatial pre-coding of the data streams and/or taking a further pre-coder for the spatial pre-coding of the further data streams out of a set of predefined pre-coders. Such a selection from a set of predefined spatial pre-coders can be signaled very efficiently to the UE and/or the further UE using an appropriate code book.

According to a further aspect of the invention there is described a method for receiving data within a mobile telecommunication system from a user equipment having at least two transmit antennas by a base station having at least two receive antennas. The described method comprises (a) providing a number of data streams at the user equipment, wherein the number of data streams is smaller than or equal to the number of transmit antennas, (b) applying a spatial pre-coding to the data streams at the user equipment, and (c) receiving the spatially pre-coded data streams by the base station via the receive antennas. Thereby, the number of transmit antennas used for transmitting the spatially pre-coded data streams is larger than the number of data streams.

Also this second aspect of the invention is based on the idea that the effective radio channel between the UE and the BS can be steered by an appropriate spatial pre-coder. Thereby, the achievable data throughput within the mobile telecommunication system can be significantly increased.

In order to allow for a correct separation of the received data streams an appropriate spatial post-processing, which corresponds in a complementary manner to the spatial pre-coding, can be carried out.

Further advantages of the described data receiving method correspond to the advantages of the above described data transmitting method. For the sake of conciseness of this application reference is made to the description above. Therein, further embodiments of the transmitting method, which also apply correspondingly for the data receiving method, have been presented in detail.

According to a further aspect of the invention there is described a user equipment for transmitting data within a mobile telecommunication system to a base station having at least two receive antennas. The described user equipment comprises (a) at least two transmit antennas, (b) a unit for providing a number of data streams, wherein the number of data streams is smaller than or equal to the number of transmit antennas, (c) a unit for applying a spatial pre-coding to the data streams, and (d) a unit for transmitting the spatially pre-coded data streams to the base station via the transmit antennas. Thereby, the number of transmit antennas used for transmitting the spatially pre-coded data streams is larger than the number of data streams.

This aspect of the invention is based on the idea that by applying a spatial pre-coding the UE can steer the effective radio channel between the UE and the BS in such a manner that the achievable data throughput within the mobile telecommunication system can be significantly increased.

According to a further aspect of the invention there is described a base station for receiving data within a mobile telecommunication system from a user equipment having at least two transmit antennas. The described base station comprises (a) at least two receive antennas, (b) a unit for receiving data streams, which have been spatially pre-coded by the user equipment and which have been transmitted to the base station via the transmit antennas. Thereby, the number of transmit antennas used for transmitting the spatially pre-coded data streams is larger than the number of data streams and the number of data streams is smaller than or equal to the number of transmit antennas.

Also this aspect of the invention is based on the idea that by applying a spatial pre-coding at the UE one can steer the effective radio channel between the UE and the BS in such a manner that the achievable data throughput within the mobile telecommunication system can be significantly increased.

According to a further aspect of the invention there is described a computer program for transferring data within a mobile telecommunication system from a user equipment having at least two transmit antennas to a base station having at least two receive antennas. The computer program, when being executed by a data processor, is adapted for controlling any embodiment of the method data transmitting and/or the data receiving method as described above.

As used herein, reference to a computer program is intended to be equivalent to a reference to a program element and/or a computer readable medium containing instructions for controlling a computer system to coordinate the performance of the above described methods.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
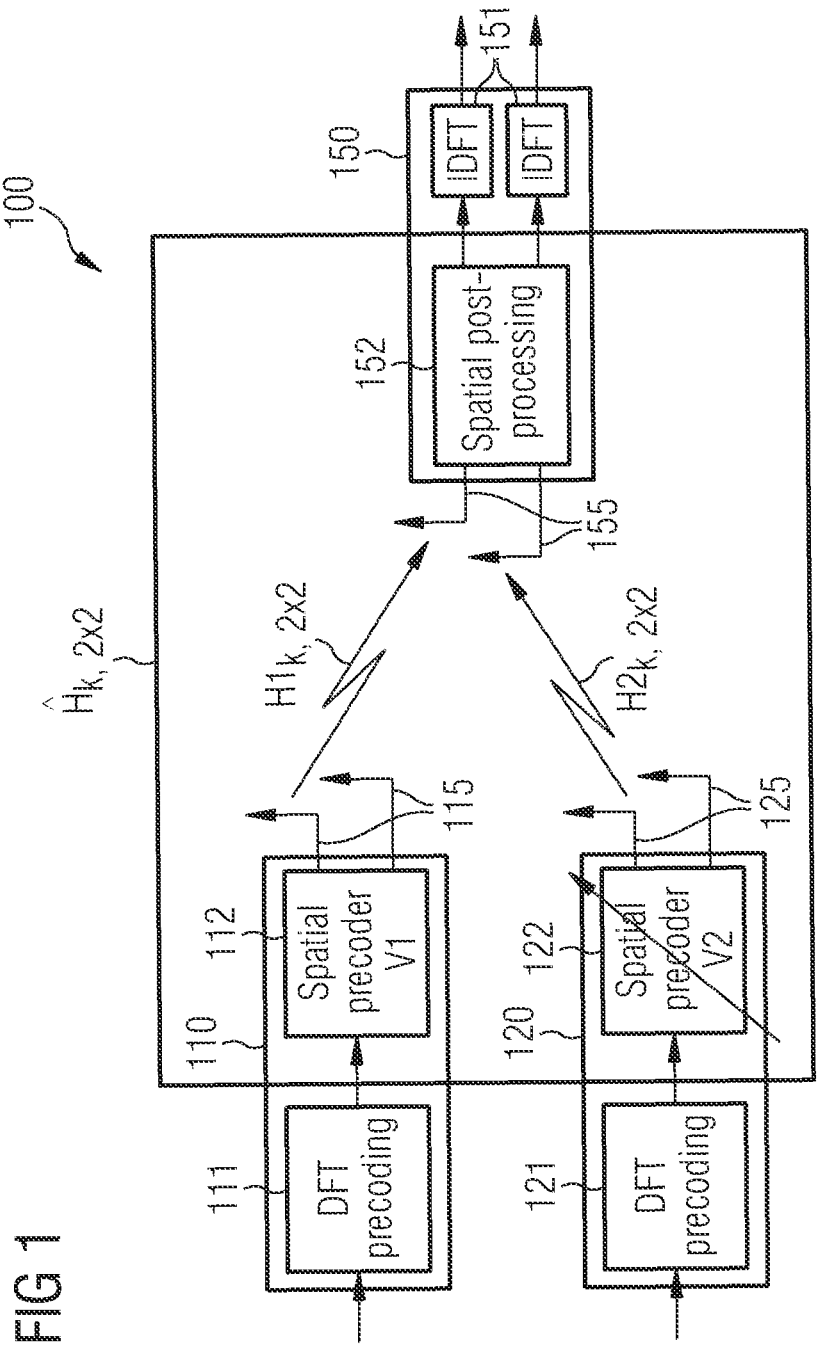
FIG. 1 shows multi-user Spatial Division Multiple Access (SDMA) radio transmission scenario in a mobile telecommunication system, wherein a spatial pre-coding is used for each UE.

FIG. 1 shows a mobile telecommunication system 100 in an operational state, in which a multi-user Spatial Division Multiple Access (SDMA) radio transmission is carried out. According to the embodiment described here the telecommunication system is Single Carrier-Frequency Division Multiple Access (SC-FDMA) telecommunication system 100. The SC-FDMA system 100 comprises a first user equipment (UE) 110 and a second UE 120. Further, the SC-FDMA system 100 comprises a Base Station (BS) 150 spanning a non depicted cell and serving the two UEs 110 and 120, which are situated within the cell of the SC-FDMA telecommunication system.

According to the embodiment described here the first UE 110 is weaker than the second UE 120. This means that the attenuation of a radio signal propagating from the first UE 110 to the BS 150 is larger than the attenuation of a radio signal propagating from the second UE 120 to the BS 150. Therefore, the first UE 110 will also be called a weak UE and the second UE 120 will also be called a strong UE. Of course, the data transmitting method described in this document may also be carried out for more than two UEs.

As can be seen from FIG. 1, the weak UE 110 comprises two transmit antennas 115, the strong UE 120 comprises two transmit antennas 125 and the BS 150 comprises two receive antennas 155. The two UEs 110 and 120 communicate with the BS 150 simultaneously.

The UEs 110 and 120 respectively transmit one data stream which is first pre-coded by a Discrete Fourier Transform (DFT) within a DFT Pre-coder 111 and 121, respectively. Each of the DFT output symbols is then fed into a spatial pre-coder 112 or 122, respectively. For the weak UE 110, preferably a fixed spatial pre-coder V1 can be used for all the DFT output symbols in order to maintain the low Peak-to-Average power Ratio (PAPR) property of the SC-FDMA waveform. For the strong UE 120 a frequency depending spatial pre-coder V2 can be used because for the strong UE 120 having a comparatively small signal path loss a relatively higher PAPR is sufficient.

The matrix describing the radio channels extending between the various transmit antennas 115 of the first UE 110 and the receive antennas 155 of the BS 150 is denominated with $H1_{k,2 \times 2}$. The matrix describing the radio channels extending between the various transmit antennas 115 of the second UE 120 and the receive antennas 155 of the BS 150 is denominated with $H2_{k,2 \times 2}$. Thereby, k denotes a particular Physical Resource Block (PRB) and 2×2 denote the MIMO configuration of two transmit antennas at the respective UE and two receive antennas at the BS.

At the BS 150, a spatial post-processing of the received radio signals is carried out by means of a Spatial Post-processor 152. Thereby, the data streams from different UEs 110, 120 are separated from each other. Then the data streams of different UEs 110, 120 are converted back to the time domain by an Inverse Discrete Fourier Transformation (IDFT) for signal detection. This is carried out in an IDFT unit 151.

In setup described here, the effective radio channel at the $k^{th}$ Physical Resource Block (PRB), denoted by $H1_{k,2\times2}$ or $H2_{k,2\times2}$, can be changed by changing the respective spatial pre-coder. In the embodiment described here, solely the spatial pre-coder V2 is varied. Thereby, V2 is a design parameter which can be selected such that the matrix $H2_{k,2\times2}$ has full rank.

In the embodiment described above with reference to FIG. 1, for the UE 110 with the larger pass loss a fixed pre-coder V1 over all the assigned PRBs is used. This pre-coder V1 has a dimension equal to (a) the number of transmit antenna by (b) the number of transmitted data streams of the first UE 110. This pre-coder V1 is easy to implement and will not destroy the low PAPR property of the transmitted signal. The effective channel can be steered by the pre-coder V2 of the second UE 120 in order to avoid rank deficiency which would increase the achievable sum rate in the SC-FDMA system 100.

To investigate the potential data throughput gain using spatial pre-coder in multi-user SDMA system, the inventors have conducted simulations in a 10 MHz bandwidth SC-FDMA telecommunication system, wherein two UEs share the whole bandwidth at the same time. It is assumed that a first UE has an average Signal-to-Noise Ratio (SNR) of 0 dB and the second UE has a SNR of 10 dB. The first UE uses a common spatial pre-coder for all the PRBs and the second UE can use frequency dependent spatial pre-coder for different PRBs.

Figure 2:
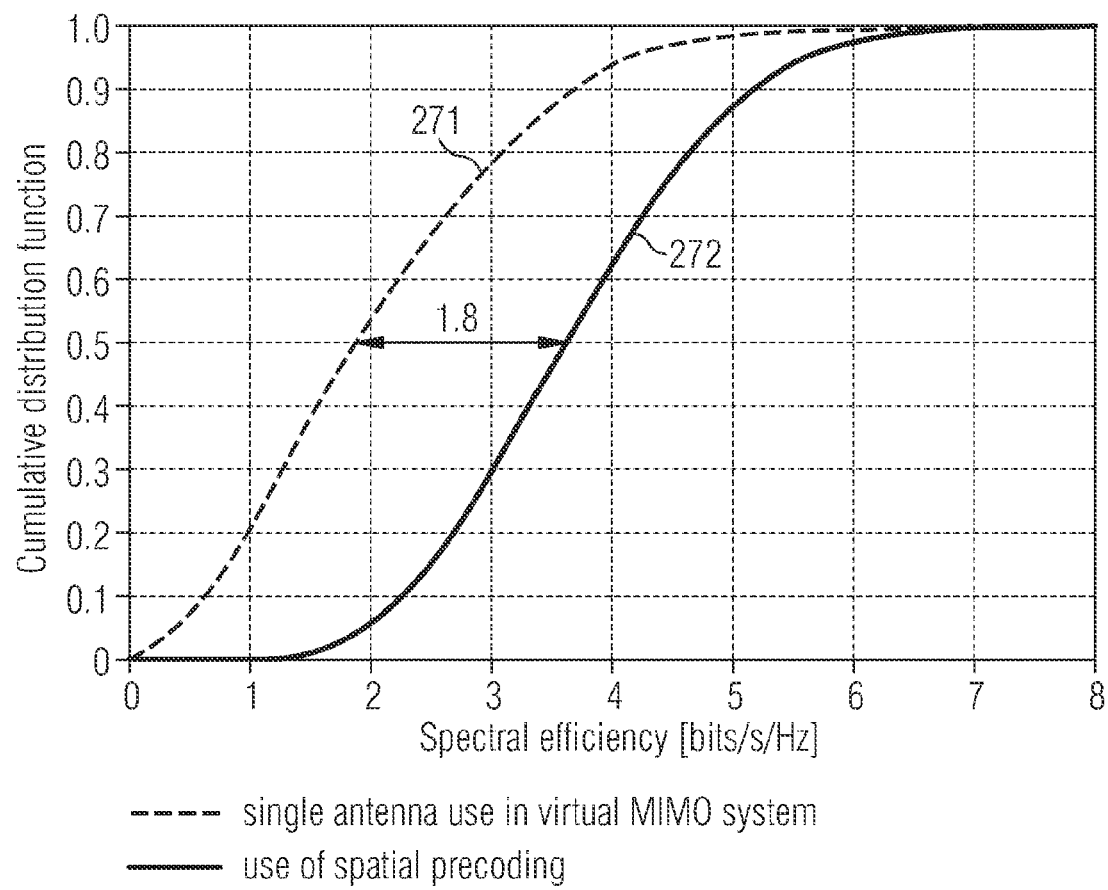
FIG. 2 shows a Cumulative Distribution Function (CDF) of the achievable spectral efficiency by using conventional multi-user SDMA with a single antenna per UE (dashed line) and by using spatial pre-coding according to FIG. 1 (full line).

The simulation results are shown in FIG. 2, wherein the performance in terms of the spectral efficiency in bits/s/Hz is plotted. Thereby, a first Cumulative Distribution Function (CDF) 271 shows the achievable spectral efficiency by using conventional multi-user SDMA with a single antenna per UE (dashed line) and a second CDF 272 shows the achievable spectral efficiency by using spatial pre-coding according to FIG. 1 (full line). It can be observed that a potential gain of 1.8 bits/s/Hz at a 50% outage can be obtained by using the spatial pre-coding scheme proposed in this document.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state: Joint channel properties of a so called virtual MIMO system can be actively influenced by applying appropriate spatial pre-coders at the UE transmit side before sending data streams to the BS. Further, a small PAPR of the transmitted signal for each UE can be maintained by using a frequency non-selective spatial pre-coder respectively a frequency non-selective beamforming, which is favorable for UEs at a cell edge caused by power limitation. On the other hand, a frequency selective optimization of the joint MIMO channel can be carried out by choosing appropriate transmit beams for at least one of the UEs. This optimization might increase PAPR but this is no drawback in the interference limited user scenario.

In this document the following publications are cited:

[1] H. G. Myung, "Introduction to single carrier FDMA," in 15th European Signal Processing Conference (EUSIPCO), Poznan, Poland, September 2007
[2] 3GPP TSG RAN, Some aspects of single-carrier transmission for E-UTRA, R1-050765, Aug. 29-Sep. 2, 2005
[3] H. G. Myung, J. Lim, and D. J. Goodman, "Peak-to-average power ratio of single carrier FDMA signals with pulse shaping," in PIMRC06, Helsinki, Finland, September 2006
[4] U. Sorger, I. Broeck, and M. Schnell, "Interleaved FDMA—a new spread-spectrum mutliple-access scheme," Atlanta, Ga., USA, June 1998, vol. 2, pp. 1013-1017
[5] J. Lim, H. G. Myung, K. Oh, and D. J. Goodman, "Channel-dependent scheduling of uplink single carrier FDMA systems," IEEE VTC06 fall, September 2006
[6] T. Svensson, T. Frank, D. Falconer, M. Sternad, E. Costa, and A. Klein, "B-IFDMA-a power efficient multiple access scheme for non-frequency-adaptive transmission," in IST mobile and wireless communications summit, Budapest, Hungary, July 2007
[7] H. Wu and T. Haustein, "Sum rate analysis of SDMA transmission in single carrier FDMA system," in Proc. 11th International Conference on Communication Systems, Guangzhou, China, November 2008

LIST OF REFERENCE SIGNS

100 SC-FDMA telecommunication system
110 first user equipment (weak)
111 DFT Pre-coder
112 Spatial Pre-coder
115 transmit antenna
120 second user equipment (strong)
121 DFT Pre-coder
122 Spatial Pre-coder (variable)
125 transmit antenna
150 base station
151 IDFT unit
152 Spatial Post-processor
155 receive antenna
271 first CDF
272 second CDF

The invention claimed is:

1. A method comprising
providing a number of data streams at a user equipment, wherein the number of data streams is smaller than a number of transmit antennas of the user equipment and wherein the data streams of the user equipment are transmitted as an effective radio channel simultaneously over a same communication bandwidth with at least one other data stream transmitted by another user equipment,
applying a spatial pre-coding to the data streams operable for beam forming a signal carrying the data streams for steering the effective radio channel between the user equipment and the base station to increase achievable data throughput for the communication bandwidth, wherein the achievable data throughput includes the data streams transmitted by the user equipment and said at least one other data stream transmitted simultaneously over the communication bandwidth by said another user equipment, and
transmitting the spatially pre-coded data streams to the base station via the transmit antennas.

2. The method as set forth in claim 1, wherein the spatial pre-coding is carried out in such a manner, that a condition number of a channel matrix representing the radio link qualities between the various transmit antennas of the user equipment and the various receive antennas of the base station is reduced.

3. The method as set forth in claim 1, wherein transmitting the spatially pre-coded data streams is carried out via all of the at least two transmit antennas.

4. The method as set forth in claim 1, wherein the mobile telecommunication system is a Multiple Input Multiple Output Single Carrier-Frequency Division Multiple Access telecommunication system.

5. The method as set forth in claim 1, further comprising
providing a number of additional data streams at an additional user equipment having at least two additional transmit antennas, wherein the number of the additional data streams is smaller than or equal to the number of the additional transmit antennas,
applying a spatial pre-coding to the additional data streams, and
transmitting the spatially pre-coded additional data streams to the base station via the additional transmit antennas, wherein the number of additional transmit antennas used for transmitting the spatially pre-coded data streams is larger than the number of additional data streams.

6. The method as set forth in claim 5, wherein the spatial pre-coding is carried out in such a manner that the sum data throughput within the mobile telecommunication system is increased.

7. The method as set forth in claim 5, wherein the spatial pre-coding is carried out in such a manner that the data throughput for the user equipment is the same as for the additional user equipment.

8. The method as set forth in claim 5, wherein
applying a spatial pre-coding to the data streams comprises applying a non-frequency selective spatial pre-coder using the eigenvector of the spatial channel extending between the user equipment and the base station and
applying a spatial pre-coding to the additional data streams comprises applying an orthogonal spatial pre-coding to the additional data streams.

9. The method as set forth in claim 5, further comprising
steering the individual data rates of the user equipment and the additional user equipment by applying a spatial scheduler.

10. The method as set forth in claim 5, wherein frequency non-selective pre-coders are used for the spatial pre-coding of the data streams and/or of the additional data streams.

11. The method as set forth in claim 5, further comprising
taking a pre-coder for the spatial pre-coding of the data streams and/or taking an additional pre-coder for the spatial pre-coding of the additional data streams out of a set of predefined pre-coders.

12. A method comprising
providing a number of data streams at a user equipment, wherein the number of data streams is smaller than a number of transmit antennas of the user equipment and wherein the data streams of the user equipment are transmitted as an effective radio channel simultaneously over a same communication bandwidth with at least one other data stream transmitted by another user equipment,
applying a spatial pre-coding to the data streams at the user equipment, the spatial pre-coding being operable for beam forming a signal carrying the data streams for steering the effective radio channel between the user equipment and the base station to increase achievable data throughput for the communication bandwidth, wherein the achievable data throughput includes the data streams transmitted by the user equipment and said at least one other data stream transmitted simultaneously over the communication bandwidth by said another user equipment, and
receiving the spatially pre-coded data streams by the base station via the receive antennas.

13. A user equipment comprising
at least two transmit antennas,
a precoder for providing a number of data streams, wherein the number of data streams is smaller than the number of transmit antennas, and wherein the data streams of the user equipment are transmitted as an effective radio channel simultaneously over a same communication bandwidth with at least one other data stream transmitted by another user equipment,
a spatial precoder for applying a spatial pre-coding to the data streams operable for beam forming a signal carrying the data streams for steering the effective radio channel between the user equipment and the base station to increase achievable data throughput for the communication bandwidth, wherein the achievable data throughput includes the data streams transmitted by the user equipment and said at least one other data stream transmitted simultaneously over the communication bandwidth by said another user equipment, and
a transmitter for transmitting the spatially pre-coded data streams to the base station via the transmit antennas.

14. A base station comprising
at least two receive antennas,
a receiver for receiving data streams, which have been spatially pre-coded by a user equipment having at least two transmit antennas and which have been transmitted to the base station via the transmit antennas, wherein the data streams of the user equipment are transmitted to the base station as an effective radio channel simultaneously over a same communication bandwidth with at least one other data stream transmitted by another user equipment, and wherein the spatial pre-coding being operable for beam forming a signal carrying the data streams for steering the effective radio channel between the user equipment and the base station to increase achievable data throughput for the communication bandwidth, wherein the achievable data throughput includes the data streams transmitted by the user equipment and said at least one other data stream transmitted simultaneously over the communication bandwidth by said another user equipment,
wherein the number of transmit antennas used for transmitting the spatially pre-coded data streams is larger than the number of data streams and
wherein the number of data streams is smaller than the number of transmit antennas.

15. A computer program product comprising a non-transitory computer-readable storage medium bearing computer program code embodied therein for use with a computer, the computer program code comprising:
code for transferring data within a mobile telecommunication system from a user equipment having at least two transmit antennas to a base station having at least two receive antennas, the computer program, when being executed by a data processor, is adapted for controlling the user equipment to perform at least the following:
providing a number of data streams at the user equipment, wherein the number of data streams is smaller than or equal to the number of transmit antennas and wherein the data streams of the user equipment are transmitted as an effective radio channel simultaneously over a same communication bandwidth with at least one other data stream transmitted by another user equipment, applying a spatial pre-coding to the data streams operable for beam forming a signal carrying the data streams for steering the effective radio channel between the user equipment and the base station to increase achievable data throughput for the communication bandwidth, wherein the achievable data throughput includes the data streams transmitted by the user equipment and said at least one other data stream transmitted simultaneously over the communication bandwidth by said another user equipment, and transmitting the spatially pre-coded data streams to the base station via the transmit antennas.

16. An apparatus, comprising:

one or more processors; and one or more memories including computer program code, the one or more memories and the computer program code configured to, with the one or more processors, cause the apparatus to perform at least the following:

provide a number of data streams at the user equipment, wherein the number of data streams is smaller than or equal to the number of transmit antennas, and wherein the data streams of the user equipment are transmitted as an effective radio channel simultaneously over a same communication bandwidth with at least one other data stream transmitted by another user equipment, apply a spatial pre-coding to the data streams operable for beam forming a signal carrying the data streams for steering the effective radio channel between the user equipment and the base station to increase achievable data throughput for the communication bandwidth, wherein the achievable data throughput includes the data streams transmitted by the user equipment and said at least one other data stream transmitted simultaneously over the communication bandwidth by said another user equipment, and transmit the spatially pre-coded data streams to the base station via the transmit antennas.

17. The method as set forth in claim 1, wherein the spatial pre-coding of the data streams is variable over frequency.

18. The method as set forth in claim 1, wherein the spatial pre-coding includes applying a spatial scheduler operable to balance a data throughput of the user equipment and said another user equipment.

19. The method as set forth in claim 1, wherein the spatially pre-coded data streams are transmitted to the base station via all the transmit antennas of the user equipment and wherein the spatial pre-coding is varied in order to avoid a rank deficiency of a channel matrix.

* * * * *